US012558829B2

(12) United States Patent
Wu et al.

(10) Patent No.: US 12,558,829 B2
(45) Date of Patent: Feb. 24, 2026

(54) INJECTION MOLDING APPARATUS WITH COOLING CHANNELS

(71) Applicant: Shenzhen Fulian Fugui Precision Industry Co., Ltd., Shenzhen (CN)

(72) Inventors: Wen-Hsiung Wu, New Taipei (TW); Xiao-Hong Fan, Shenzhen (CN); Fei Li, Shenzhen (CN)

(73) Assignee: Shenzhen Fulian Fugui Precision Industry Co., Ltd., Shenzhen (CN)

( * ) Notice: Subject to any disclaimer, the term of this patent is extended or adjusted under 35 U.S.C. 154(b) by 256 days.

(21) Appl. No.: 18/385,733

(22) Filed: Oct. 31, 2023

(65) Prior Publication Data

US 2025/0121544 A1 Apr. 17, 2025

(30) Foreign Application Priority Data

Oct. 11, 2023 (CN) .......................... 202311324099.6

(51) Int. Cl.
B29C 45/73 (2006.01)
B29C 33/04 (2006.01)

(52) U.S. Cl.
CPC .......... B29C 45/7312 (2013.01); B29C 33/04 (2013.01)

(58) Field of Classification Search
CPC ...... B29C 33/00; B29C 45/00; B29C 45/7312
See application file for complete search history.

(56) References Cited

U.S. PATENT DOCUMENTS

| | | | | |
|---|---|---|---|---|
| 4,085,178 A | * | 4/1978 | McNeely | ................. B29C 45/38 |
| | | | | 264/161 |
| 4,260,360 A | * | 4/1981 | Holmes | ............... B29C 45/2642 |
| | | | | 264/106 |

| | | | | |
|---|---|---|---|---|
| 5,744,173 A | * | 4/1998 | Sterett | ................. B29C 45/7312 |
| | | | | 264/40.6 |
| 7,008,211 B2 | * | 3/2006 | Lee | .......................... B29C 33/02 |
| | | | | 425/588 |
| 7,300,609 B2 | * | 11/2007 | Gabriel | ............... B29C 45/2642 |
| | | | | 264/106 |
| 10,442,125 B2 | * | 10/2019 | Franksson | ........... B29C 45/2642 |

FOREIGN PATENT DOCUMENTS

| | | | |
|---|---|---|---|
| CN | 101161445 B | | 8/2012 |
| CN | 104923660 A | | 9/2015 |
| CN | 206870279 U | * | 1/2018 |
| CN | 213006263 U | | 4/2021 |
| CN | 114311522 A | | 4/2022 |
| CN | 219338479 U | * | 7/2023 |
| DE | 102015204889 A1 | | 9/2016 |
| JP | 2002264191 A | | 9/2002 |

* cited by examiner

*Primary Examiner* — Atul P. Khare

(74) *Attorney, Agent, or Firm* — ScienBiziP, P.C.

(57) ABSTRACT

An injection molding apparatus includes a first mold, a first mold module, and a cover plate. The first mold includes a first receiving groove. The first mold module is disposed in the first receiving groove. The first mold module includes an upper surface, a lower surface, an injection groove formed on the lower surface, a central channel formed on the upper surface, and cooling channels formed on the upper surface. The central channel and the first ends of the cooling channels are above the injection groove. The cover plate covers the upper surface, the central channel, and the cooling channels. The injection groove, the central channel, and the cooling channels are separated from each other, and the cooling channels are arranged radially on the upper surface and surround the central channel.

17 Claims, 10 Drawing Sheets

INJECTION MOLDING APPARATUS WITH COOLING CHANNELS

FIELD

The subject matter herein generally relates injection molding apparatuses having cooling channels.

BACKGROUND

Injection molding apparatus has been widely used in the manufacturing industry to shape plastic into plastic products. The injection molding apparatus can inject plastic into the product chamber between the male mold plate and the female mold plate. After the plastic is cooled, a plastic product is formed in the product chamber. At this time, the injection molding apparatus can drive an ejection mechanism to separate the plastic product from the male mold plate, and then the plastic product can be taken out of the injection molding apparatus.

In the conventional art, in order to speed up the cooling rate of plastic in the product chamber, a cooling channel is provided on the female mold plate. However, the cooling channels are generally elongated grooves, extending linearly and with the same depth, which would cause uneven cooling of plastic. Such that the outer surface of the plastic product may have problems, such as bonding lines, stress marks, or air marks, which make it difficult to meet the requirement of the quality of the plastic product.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
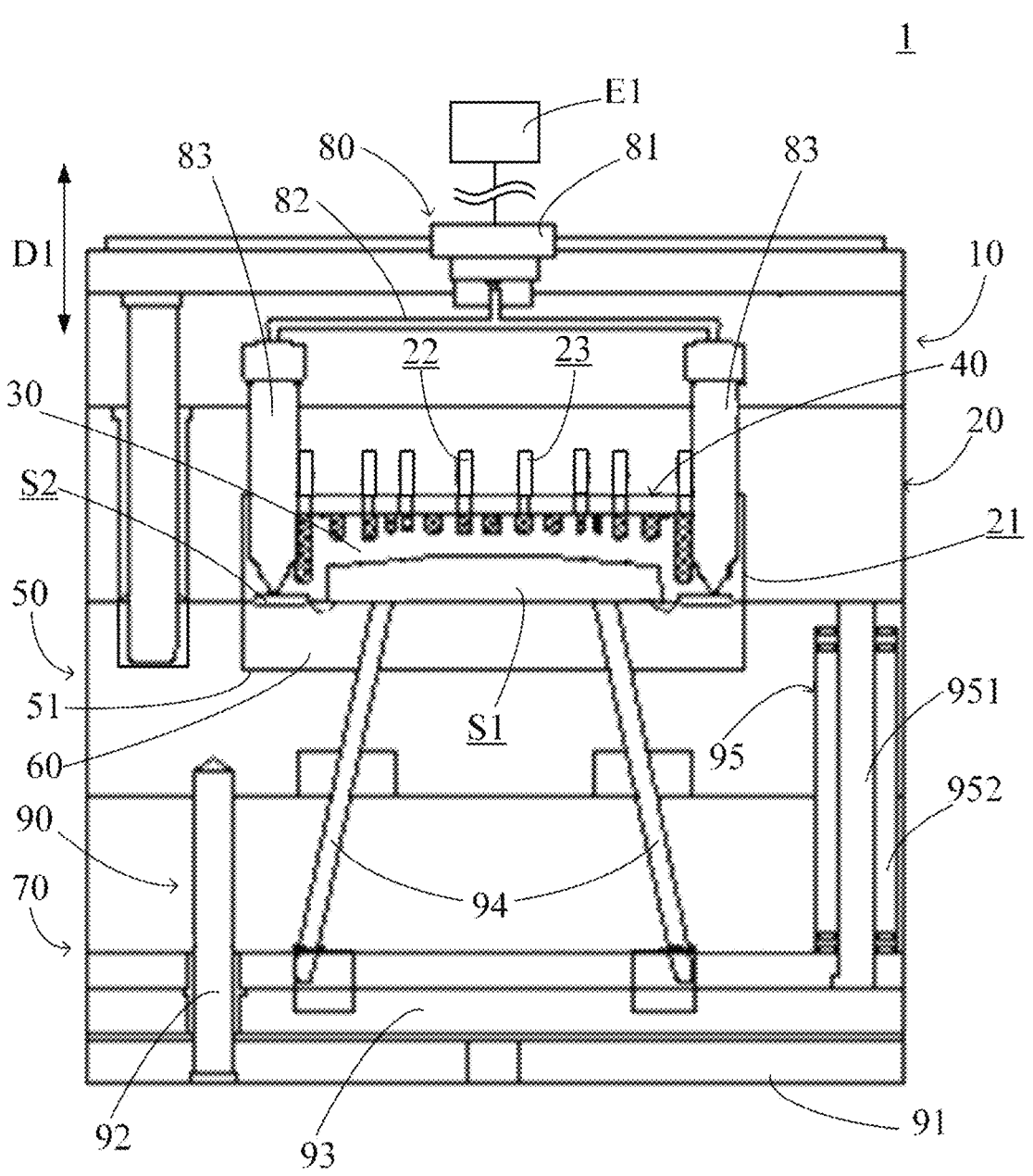
FIG. 1 is a schematic diagram illustrating an injection molding apparatus in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

The term "connect" is defined as directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

In the present disclosure, an injection molding apparatus is provided. The cooling channels of the injection molding apparatus match the surface of the plastic product made by the injection molding apparatus, thereby reducing the probability of bonding lines, stress marks, or air marks appearing on the plastic product, and thus improving the quality of the plastic product.

Figure 2:
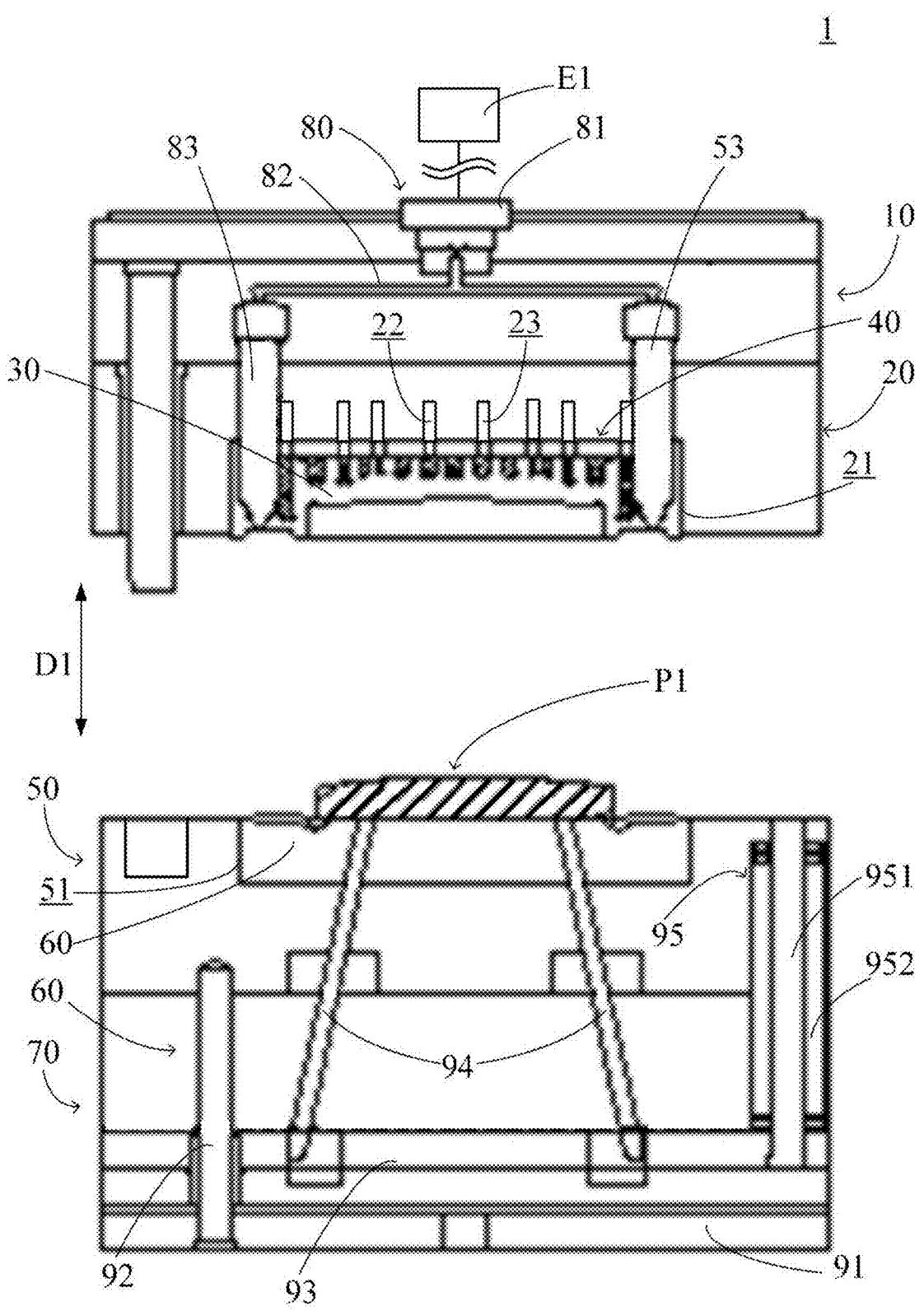
FIG. 2 and FIG. 3 are schematic diagrams illustrating operations of the injection molding apparatus 1 in FIG. 1.

FIG. 1 is a schematic diagram of an injection molding apparatus 1 in accordance with an embodiment of the present disclosure. The injection molding apparatus 1 is used to make plastic to be a plastic product P1 (as shown in FIG. 2). The injection molding apparatus 1 includes an upper frame 10, a first mold 20, a first mold module 30, a cover plate 40, a second mold 50, a second mold module 60, and a base 70. The upper frame 10, the first mold 20, the first mold module 30, the cover plate 40, the second mold 50, the second mold module 60, and the base 70 are arranged sequentially along a vertical direction D1, and respectively extend perpendicularly to the vertical direction D1.

In the embodiment, the first mold 20, the first mold module 30, the cover plate 40, the second mold 50, and the second mold module 60 may be plate structures. The widths of the upper frame 10, the first mold 20, the second mold 50, and/or the base 70 may be the same or approximately the same. The widths of the first mold module 30 and the second mold module 60 are the same or approximately the same. The widths are measured in a direction (horizontal direction) perpendicular to the vertical direction D1. In the present disclosure, the term "approximately the same" means a tolerance range from −10% to +10%, including the meaning of "the same". The upper frame 10, the first mold 20, the first mold module 30, the cover plate 40, the second mold 50, the second mold module 60, and/or the base 70 may be made of metal materials, such as steel.

The first mold 20 is connected to the bottom of the upper frame 10. In the embodiment, the first mold 20 is detachably affixed to the upper frame 10. The first mold 20 is between the upper frame 10 and the second mold 50. The first mold 20 includes a first receiving groove 21. The first mold module 30 is detachably disposed in the first receiving groove 21. The first mold module 30 can be replaced with another first mold module according to the shape of different plastic products P1. The cover plate 40 is detachably disposed on the first mold module 30, and contacts the bottom of the first receiving groove 21.

The second mold 50 is under the bottom of the first mold 20. In the embodiment, the first mold 20 can selectively contact the second mold 50, or be separated from the second mold 50. The second mold 50 is between the first mold 20 and the base 70. The second mold 50 includes a second receiving groove 51. The second mold module 60 is detachably disposed in the second receiving groove 51, and corresponds to the first mold module 30. The second mold module 60 can be replaced with another second mold module according to the shape of different plastic product P1. The first mold module 30 can selectively contact the second mold module 60, or be separated from the second mold module. When the first mold module 30 contacts the second mold module 60, a product chamber S1 and an injection chamber S2 are formed between the first mold module 30 and the second mold module 60, and the injection chamber S2 is in communication with the product chamber S1.

In the embodiment, the first mold 20 may be a female mold plate, and the first mold module 30 may be a female mold module. The second mold 50 may be a male mold plate, and the second mold module 60 may be a male mold module. In another embodiment, the first mold 20 may be a male mold plate, and the first mold module 30 may be a male mold module. The second mold 50 may be a female mold plate, and the second mold module 60 may be a female mold module.

The base 70 is connected to the bottom of the second mold 50. The base 70 can be placed on a platform or on the ground. In the embodiment, the second mold 50 is detachably affixed to the base 70.

The injection molding apparatus 1 further includes an injection mechanism 80 and an ejection mechanism 90. The injection mechanism 80 is used to inject plastic into the product chamber S1. The ejection mechanism 90 is used to eject the plastic product P1 formed by the cooled plastic in the product chamber S1 out of the second mold module 60.

The injection mechanism 80 is disposed in the upper frame 10 and the first mold 20. In the embodiment, the injection mechanism 80 includes an injection joint 81, a thermal manifold tube 82, and thermal nozzles 83. The injection joint 81 is disposed on the upper frame 10. The thermal manifold tube 82 is disposed in the upper frame 10, and connected to the thermal nozzles 83.

The thermal nozzles 83 are disposed in the upper frame 10 and the first mold 20. One end of each of the thermal nozzles 83 is connected to the thermal manifold tube 82, and another end of each of the thermal nozzles 83 is connected to the injection chamber S2. In the embodiment, the injection mechanism 80 includes two thermal nozzles 83, but it is not limited thereto. In another embodiment, the injection mechanism 80 includes one thermal nozzle 83 or at least three thermal nozzles 83. The thermal nozzles 83 extend in the vertical direction D1. The thermal nozzles 83 may be parallel to each other.

In the embodiment, the injection joint 81 is connected to an injection device E1. The injection device E1 supplies plastic to the injection joint 81. The plastic flows into the injection chamber S2 via the injection joint 81, the thermal manifold tube 82, and the thermal nozzle 83. Next, the plastic flows into the product chamber S1 from the injection chamber S2. The plastic in the product chamber S1 forms the plastic product P1 after the plastic cools and hardens.

The ejection mechanism 90 is disposed in the base 70 and the second mold 50. The ejection mechanism 90 includes a holding plate 91, a guide pillar 92, an ejection plate 93, ejection pins 94, and a drive mechanism 95. The holding plate 91 is under the bottom of the base 70. The guide pillar 92 is disposed on the holding plate 91. The guide pillar 92 extend perpendicular to the holding plate 91, or extend in the vertical direction D1. In the embodiment, one end of the guide pillar 92 is affixed to the holding plate 91, and another end of the guide pillar 92 extends into the second mold 50. Moreover, the guide pillar 92 passes through the ejection plate 93.

The ejection plate 93 is moveably disposed in the base 70, and between the holding plate 91 and the second mold 50. The ejection plate 93 may extend perpendicular to the vertical direction D1, and the ejection plate 93 can be moved along the guide pillar 92. In other words, the guide pillar 92 limits the ejection plate 93 moving in the vertical direction D1.

The ejection pins 94 are connected to the ejection plate 93, and can be moved in the vertical direction D1. In the embodiment, the ejection pins 94 may be angular pins. One end of each of the ejection pins 94 is connected to the ejection plate 93, and another end of each of the ejection pins 94 contacts the product chamber S1. The drive mechanism 95 is disposed in the base 70 and the second mold 50, and used to move the ejection plate 93. In the embodiment, the drive mechanism 95 includes a drive rod 951 and an elastic element 952. One end of the drive rod 951 is affixed to the ejection plate 93. The drive rod 951 passes through the second mold 50, and passes through the elastic element 952. The drive rod 951 limits the ejection plate 93 moving in the vertical direction D1. One end of the elastic element 952 is affixed to the ejection plate 93, and another end of the elastic element 952 is affixed in the second mold 50. The elastic element 952 provides a pull force to the ejection plate 93.

Figure 3:
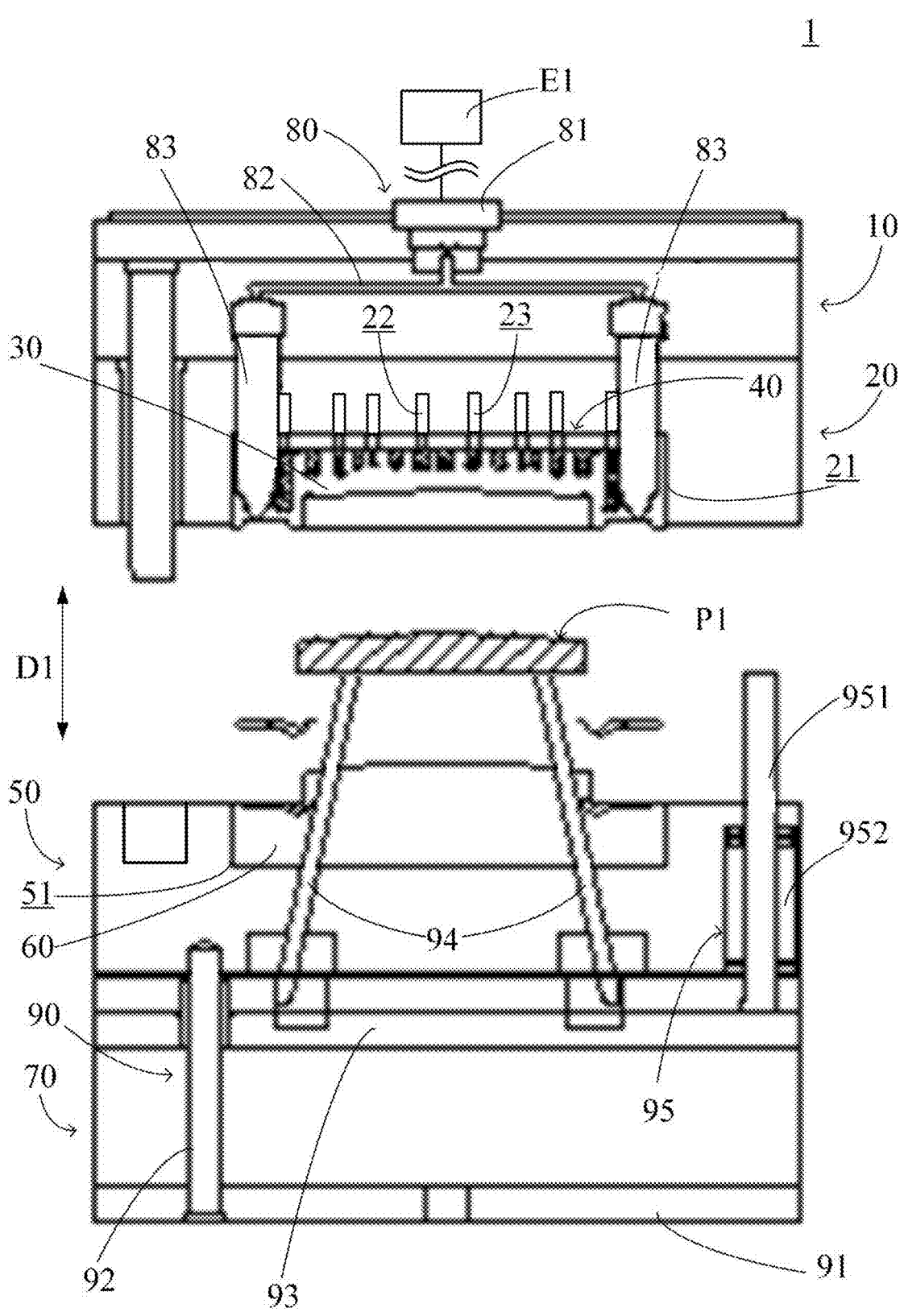

FIG. 2 and FIG. 3 are schematic diagram of operating the injection molding apparatus 1 in accordance with an embodiment of the present disclosure. As shown in FIG. 1, the injection molding apparatus 1 is used to make the plastic product P1. First, the first mold 20 is connected to the second mold 50. The injection device E1 injects plastic into the injection chamber S2 and the product chamber S1 via the injection joint 81, the thermal manifold tube 82, and the thermal nozzle 83. Next, after the plastic in the product chamber S1 is cooled, the plastic forms the plastic product P1 (as shown in FIG. 2).

As shown in FIG. 2, the first mold 20 is separated from the second mold 50 to expose the plastic product P1 out of the second mold module 60. Since the first mold 20 is separated from the second mold 50, the elastic element 952 pulls the ejection plate 93 raising in the vertical direction D1. As shown FIG. 3, after the drive rod 951 and the ejection pins 94 are raised in the vertical direction D1, the drive rod 951 and the ejection pins 94 protrude over the second mold 50 and the second mold module 60. Next, the ejection pins 94 separate the plastic product P1 from the second mold module 60, so that the plastic product P1 can be taken out from the injection molding apparatus 1.

Figure 4:
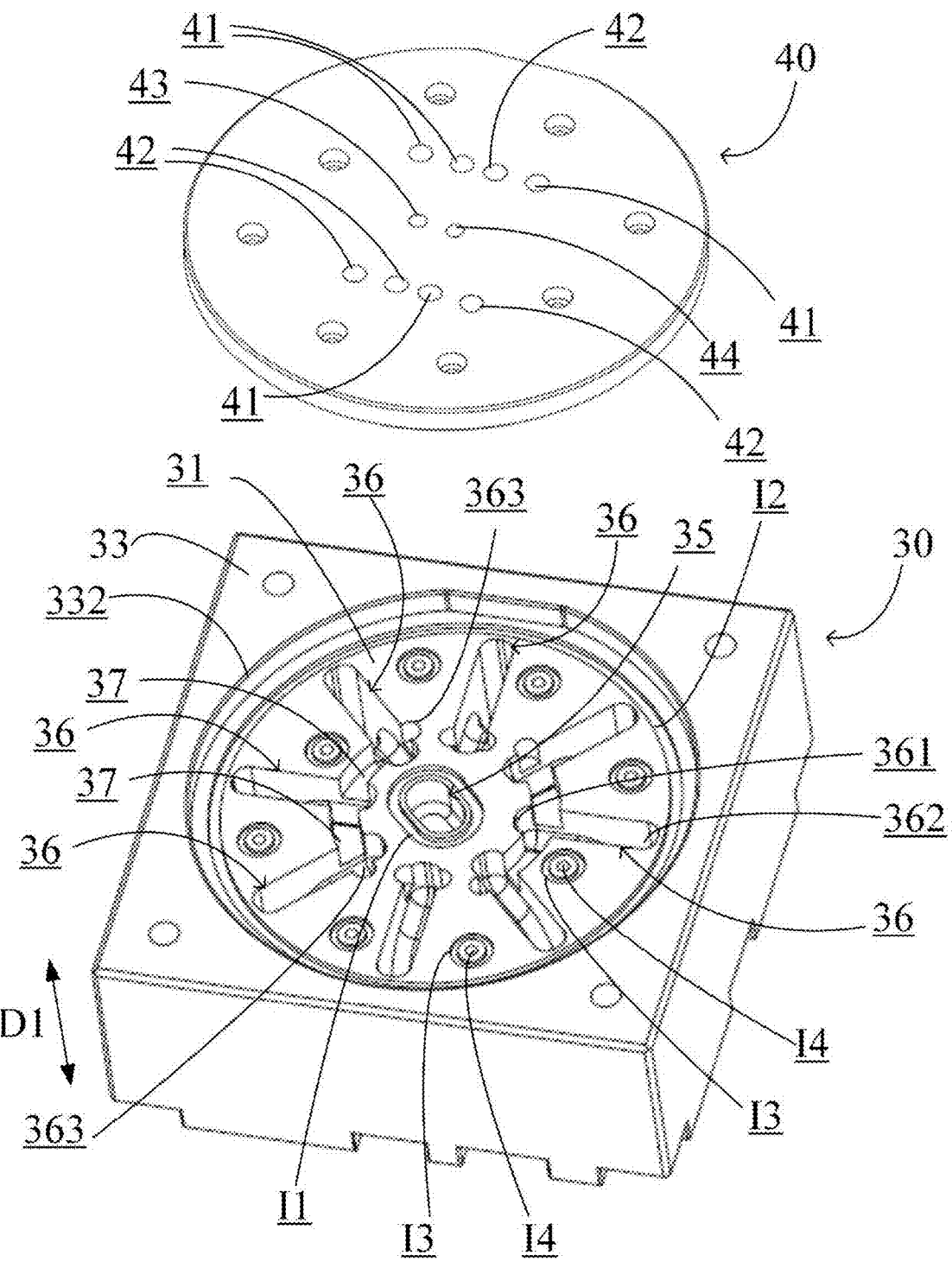
FIG. 4 is an exploded view illustrating a first mold module and a cover plate in accordance with a first embodiment of the present disclosure.
Figure 5:
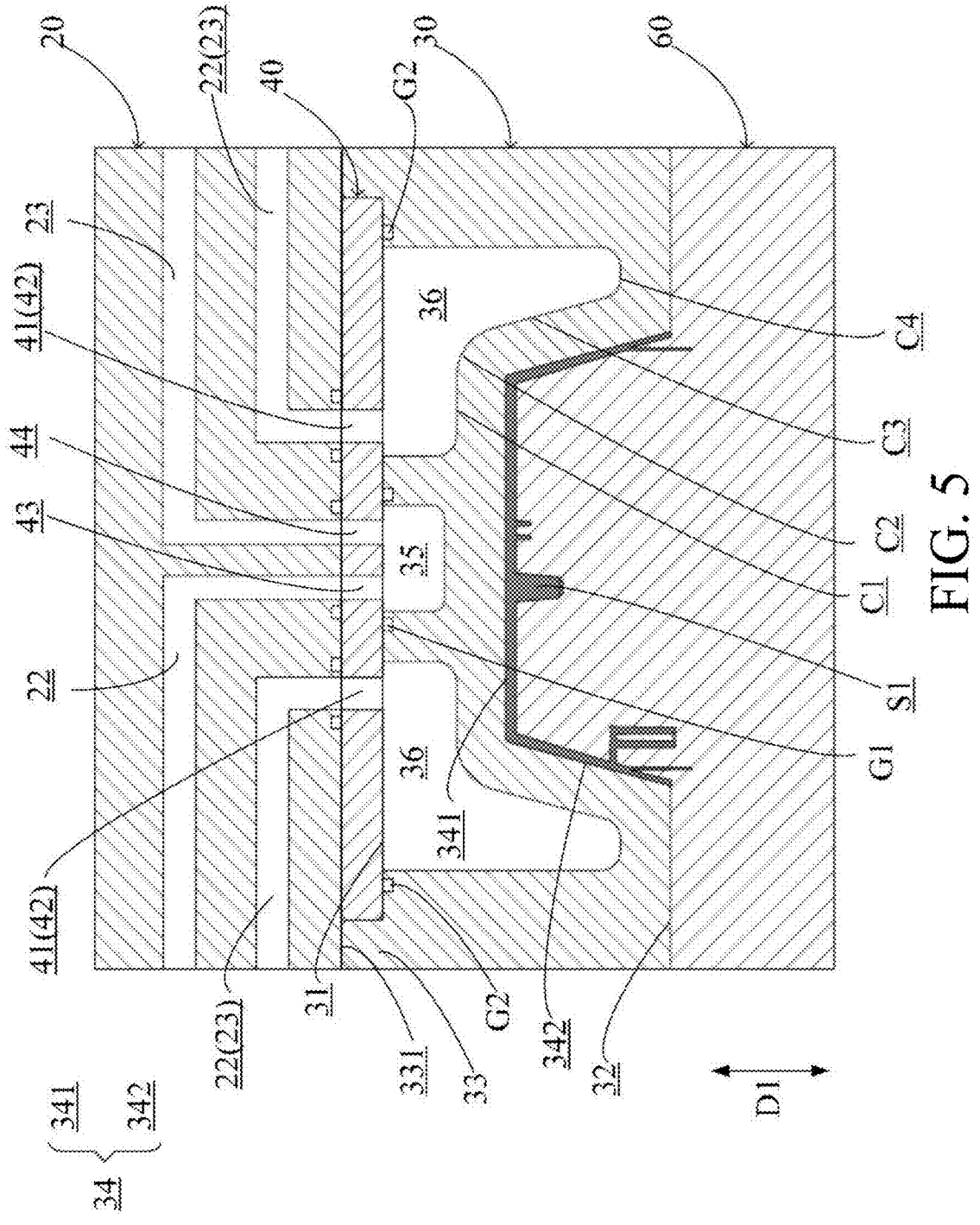
FIG. 5 is a schematic diagram illustrating a first mold, the first mold module, the cover plate, and a second mold module in accordance with the first embodiment of the present disclosure.
Figure 6:
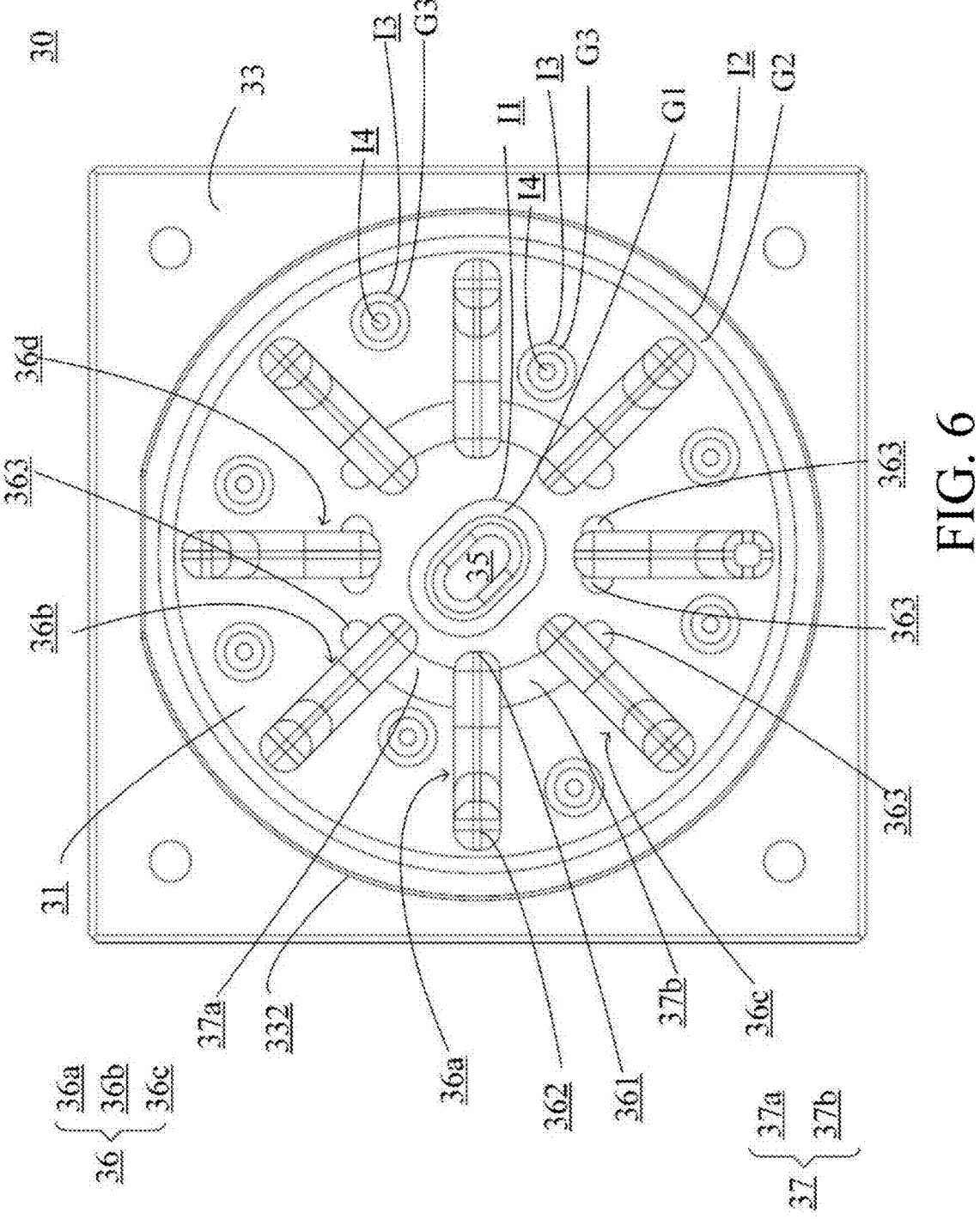
FIG. 6 is a top view illustrating the first mold module in FIG. 4.
Figure 7:
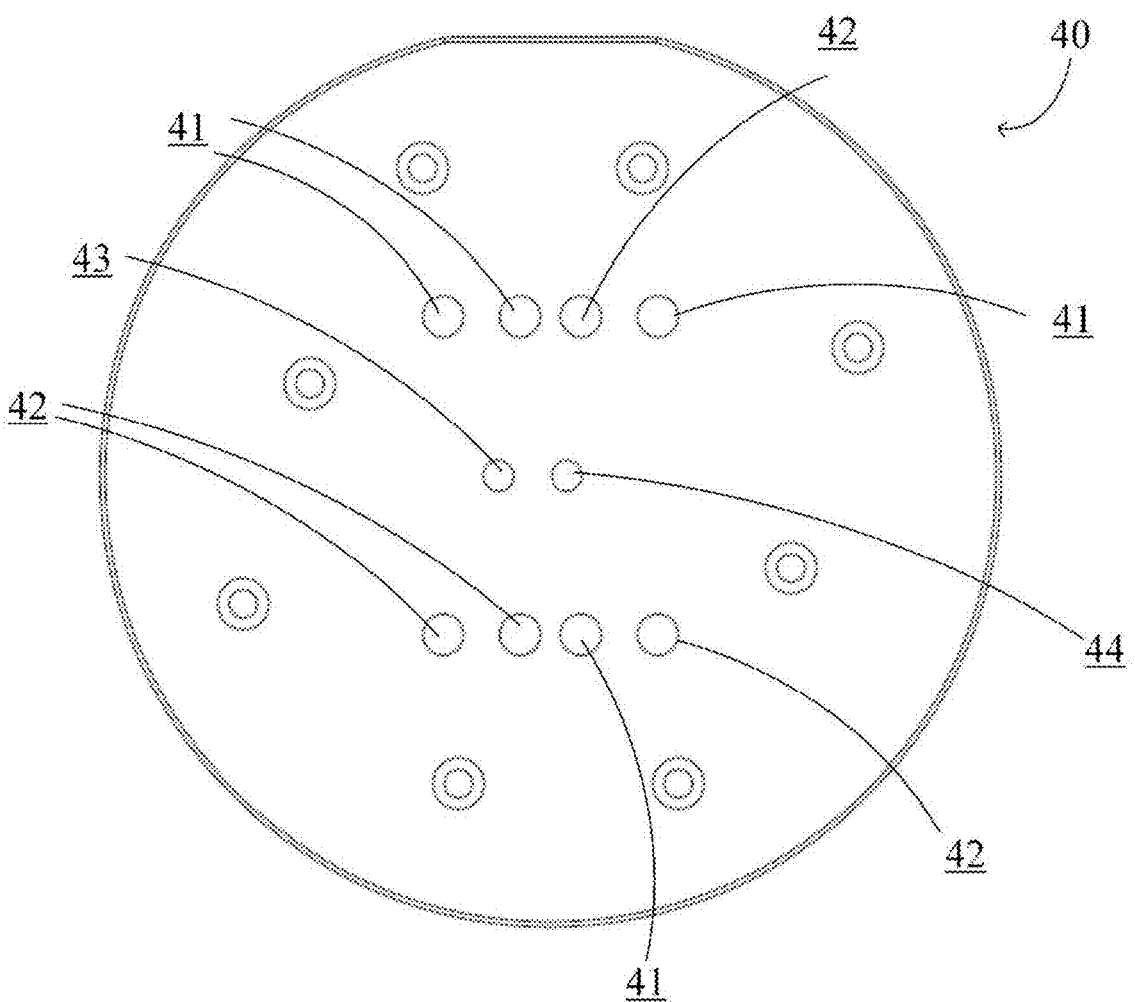
FIG. 7 is a top view illustrating the cover plate in FIG. 4.

FIG. 4 is an exploded view of the first mold module 30 and the cover plate 40 in accordance with a first embodiment of the present disclosure. FIG. 5 is a schematic diagram of the first mold 20, the first mold module 30, the cover plate 40, and the second mold module 60 in accordance with the first embodiment of the present disclosure. FIG. 6 is a top view of the first mold module 30 in accordance with the first embodiment of the present disclosure. FIG. 7 is a top view of the cover plate 40 in accordance with the first embodiment of the present disclosure.

The first mold module 30 includes an upper surface 31, a lower surface 32, and a position block 33. The upper surface 31 may be parallel to lower surface 32, and the upper surface 31 and the lower surface 32 extend perpendicular to the vertical direction D1. The upper surface 31 faces the bottom of the first receiving groove 21 of the first mold 20 (as shown in FIG. 1). The lower surface 32 faces the second mold module 60. In the embodiment, the position block 33 is disposed on the upper surface 31. The top surface 331 of the position block 33 contacts the upper frame 10. The position block 33 forms a cover groove 332, and the cover plate 40 is placed in the cover groove 332. The bottom of the cover groove 332 is the upper surface 31 of the first mold module 30. In another embodiment, the first mold module 30 does not include the position block 33, the top surface 331 and the cover groove 332. The cover plate 40 is placed on the upper surface 31.

The first mold module 30 further includes an injection groove 34, a central channel 35, cooling channels 36, and connection channels 37. The injection groove 34, the central channel 35, and the cooling channels 36 are separated from each other. The connection channels 37 are separated from each other. Each of the connection channels 37 is connected to two adjacent cooling channels 36.

The injection groove 34 is formed on the lower surface 32. When the first mold module 30 contacts the second mold module 60, a product chamber S1 is formed between the injection groove 34 and the second mold module 60. In the embodiment, the injection groove 34 has a top surface 341 and a side wall 342. The side wall 342 is connected to the top surface 341 and the lower surface 32. In the embodiment, the top surface 341 may be a circle. The side wall 342 may be an annular structure, connected to the top surface 341 and the lower surface 32. The side wall 342 may be inclined relative to the vertical direction D1, the top surface 341, and the lower surface 32.

The central channel 35, the cooling channels 36, and the connection channels 37 are filled with cooling liquid to cool the plastic in the injection groove 34 and the product chamber S1. In the embodiment, the cooling liquid can be water, but it is not limited thereto. The central channel 35 is formed on the upper surface 31, and in the central area of the upper surface 31. In the embodiment, the center of the upper surface 31 is in the central channel 35. The central channel 35 is over the center of the top surface 341 of the injection groove 34.

In the embodiment, the width of the top surface 341 of the injection groove 34 is greater than two times the width of the central channel 35. The width of the top surface 341 of the injection groove 34 is less than five times the width of the central channel 35. The widths are measured in the same direction, which is perpendicular to the vertical direction D1. The depth of the central channel 35 is greater than 0.3 times the distance of the central channel 35 and the injection groove 34. The depth of the central channel 35 is less than 2 times the distance of the central channel 35 and the injection groove 34. The depth and the distance are measured in the vertical direction D1.

The cooling channels 36 are formed on the upper surface 31, and in the edge area of the upper surface 31. The edge area surrounds the central area. The cooling channels 36 are arranged radially on the upper surface 31, and surround the central channel 35 and the side wall 342 of the injection groove 34. In the embodiment, the first ends 361 of the cooling channels 36 are adjacent to the central channel 35, and the second ends 362 of the cooling channels 36 are adjacent to the edge of the first mold module 30 or the upper surface 31. In other words, the first ends 361 of the cooling channels 36 are closer to the central channel 35 relative to the second ends 362 of the cooling channels 36. The distance of two adjacent first ends 361 of the cooling channels 36 is less than the distance of two adjacent second ends 362 of the cooling channels 36.

In the embodiment, each of the openings of the cooling channels 36 on the upper surface 31 are elongated structure, and extends linearly. Each of the extensions of the openings of the cooling channels 36 on the upper surface 31 passes through the central channel 35. In other words, the longitudinal axes of the openings of the cooling channels 36 on the upper surface 31 pass through the first ends 361 and the second ends 362, and the extensions of the longitudinal axes pass through the central channel 35 or the center of the upper surface 31 of the first mold module 30. Each of lengths of the openings of the cooling channels 36 on the upper surface 31 is greater than two times or three times the width of the central channel 35.

The contour of the bottom surface of the cooling channel 36 corresponds to the contours of the top surface 341 and the side wall 342 of the injection groove 34. The depth of the second end 362 of the cooling channel 36 is greater than the depth of the first end 36. In the embodiment, the depth of the second end 362 of the cooling channel 36 is greater than two times of the depth of the first end 36. The depths are measured in the vertical direction D1.

In the embodiment, the bottom surface of the cooling channels 36 has a first section C1, a curved section C2, an inclined section C3, and a second section C4. The first section C1 is over the top surface 341 of the injection groove 34. The length of the first section C1 is between 0.3 times and 2 times the width of the central channel 35. The length and the width are measured in the same direction, which is perpendicular to the vertical direction D1. The curved section C2 corresponds to the boundary of the top surface 341 and the side wall 342 of the injection groove 34. The inclined section C3 corresponds to the side wall 342 of the injection groove 34, and the second section C4 is over the lower surface 32. In a cross section of the cooling channels 36, the first section C1 and the inclined section C3 are straight line, the curved section C2 is a curve, and the second section C4 can be a curve or has a straight portion.

In the embodiment, the distance of the first section C1 and the top surface 341 of the injection groove 34 is between 0.8 times and 1.2 times (or 0.9 times and 1.1 times) the distance of the inclined section C3 and the side wall 342 of the injection groove 34. The distance of the first section C1 and the top surface 341 of the injection groove 34 is between 0.8 times and 1.2 times (or 0.9 times and 1.1 times) the distance of the curved section C2 and the boundary of the top surface 341 and the side wall 342. The distance of the first section C1 and the top surface 341 of the injection groove 34 is between 0.8 times and 1.2 times (or 0.9 times and 1.1 times) the distance of the second section C4 and the lower surface 32 of the first mold module 30.

In the embodiment, the first mold module 30 includes eight cooling channels 36. In some embodiments, the first mold module 30 includes at least four, five, six, seven, or eight cooling channels 36. In one embodiment, the first mold module 30 includes four to twenty cooling channels 36.

The connection channel 37 is connected to an area of the cooling channel 36 between the first end 361 and the second end 362. In other words, the connection channel 37 is connected to the central area of the cooling channel 36, and close to the first end 361. In other words, the distance of the connection channel 37 and the first end 361 of the cooling channels 36 is less than the distance of the connection channel 37 and the second end 362 of the cooling channels 36.

In the embodiment, the connection channels 37 are curved structures. The connection channels 37 extend and are arranged along an annular path, and the central channel 35 is in the annular path. In one embodiment, the annular path is a circle path, and the center of the annular path is the central channel 35 or the center of the upper surface 31 of the first mold module 30.

As shown in FIG. 6, two adjacent connection channels 37 are connected to three adjacent cooling channels 36. In other words, two adjacent connection channels 37 (a first connection channel 37a and a second connection channel 37b) are connected to the same cooling channel 36 (a first cooling channel 36a). Two ends of the first connection channel 37a are connected to the first cooling channels 36a and the second cooling channels 36b. The ends of the second connection channel 37b are connected to two adjacent connection channels 37 (the first cooling channel 36a and a third cooling channel 36c). The first cooling channel 36a is between the second cooling channel 36b and the third cooling channel 36c, and adjacent to the second cooling channel 36b and the third cooling channel 36c. Moreover, in this embodiment, the fourth cooling channel 36d does not be connected to any connection channel 37.

The cover plate 40 covers the upper surface 31, the central channel 35, the cooling channels 36, and the connection channels 37. In the embodiment, the cover plate 40 is in the cover groove 332. The cover plate 40 further includes first cooling holes 41, second cooling holes 42, a central injection hole 43, and a central exhaust hole 44. Each of the first cooling holes 41 is in communication with one of the cooling channels 36, and each of the second cooling holes 42 is in communication with one of the cooling channels 36. In other words, one of the cooling channels 36 is connected to one of the first cooling holes 41 and/or one of the second cooling holes 42. The central injection hole 43 and the central exhaust hole 44 are in communication with the central channel 35.

In the embodiment, each of the first cooling holes 41 is in communication with one side of one of the first ends 361 of the cooling channels 36, and each of the second cooling holes 42 is in communication with another side of one of the first ends 361 of the cooling channels 36. As shown in FIG. 6, one of the first cooling holes 41 is connected to one side of the second cooling channel 36b, and one of second cooling holes 42 is connected to another side of the third cooling channel 36c. Two adjacent first cooling hole 41 and second cooling hole 42 are connected to opposite sides of the fourth cooling channel 36d. In the embodiment, some of the cooling channels 36 have protrusion portions 363 on sides of the cooling channels 36, and the protrusion portions 363 are connected to the first cooling holes 41 or the second cooling holes 42.

In the embodiment, the first mold 20 further includes injection channels 22 and exhaust channels 23. Each of the injection channels 22 is in communication with one of the first cooling holes 41 or the central injection hole 43. Each of the exhaust channels 23 is in communication with one of the second cooling holes 42 or the central exhaust hole 44. The injection channels 22 provide cooling liquid to the cooling channels 36, the connection channels 37 and the central channel 35 via the first cooling holes 41 and the central injection hole 43 of the cover plate 40. The cooling liquid of the cooling channels 36, the connection channels 37 and the central channel 35 is exhausted to the exhaust channels 23 via the second cooling holes 42 and the central exhaust hole 44 of the cover plate 40.

In another embodiment, each of the injection channels 22 is in communication with one of the second cooling holes 42 or the central injection hole 43. Each of the exhaust channels 23 is in communication with one of the first cooling holes 41 or the central exhaust hole 44. The injection channels 22 provide cooling liquid into the cooling channels 36, the connection channels 37 and the central channel 35 via the second cooling holes 42 and the central injection hole 43 of the cover plate 40. The cooling liquid of the cooling channels 36, the connection channel 37 and the central channel 35 is exhausted to the exhaust channels 23 via the first cooling holes 41 and the central exhaust hole 44 of the cover plate 40.

In the embodiment, the first mold module 30 further includes a central seal groove I1, a main seal groove I2, inner seal grooves I3, and fastening holes I4. The central seal groove I1, the main seal groove I2, inner seal grooves I3, and fastening holes I4 are formed on the upper surface 31 of the first mold module 30. The central seal groove I1 surrounds the central channel 35. A central waterproof ring G1 is disposed in the central seal groove I1, and abuts the cover plate 40.

The main seal groove I2 surrounds the cooling channels 36, the connection channels 37 and the central seal groove I1. A main waterproof ring G2 is disposed in the main seal groove I2, and abuts the cover plate 40. The inner seal grooves I3 and the fastening holes I4 are between the central seal groove I1 and the main seal groove I2, and each of the inner seal grooves I3 surrounds one of the fastening holes I4. The cover plate 40 is affixed to the first mold module 30 via the fastening holes I4 by fastening elements, such as screws. As shown in FIG. 6, each of the inner waterproof rings G3 is disposed in one of the inner seal grooves I3, and abuts the cover plate 40.

Figure 8:
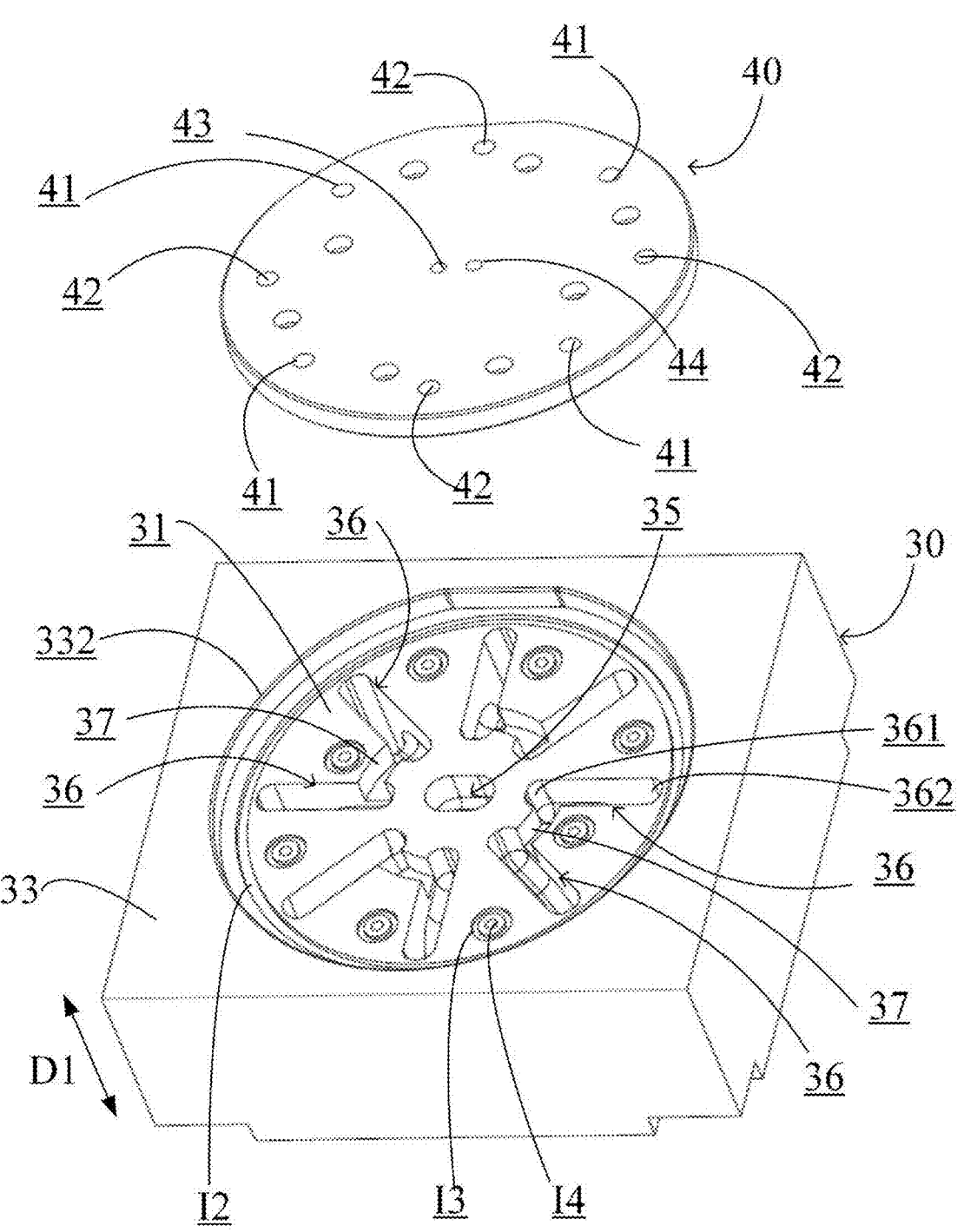
FIG. 8 is an exploded view illustrating the first mold module and the cover plate in accordance with a second embodiment of the present disclosure.
Figure 9:
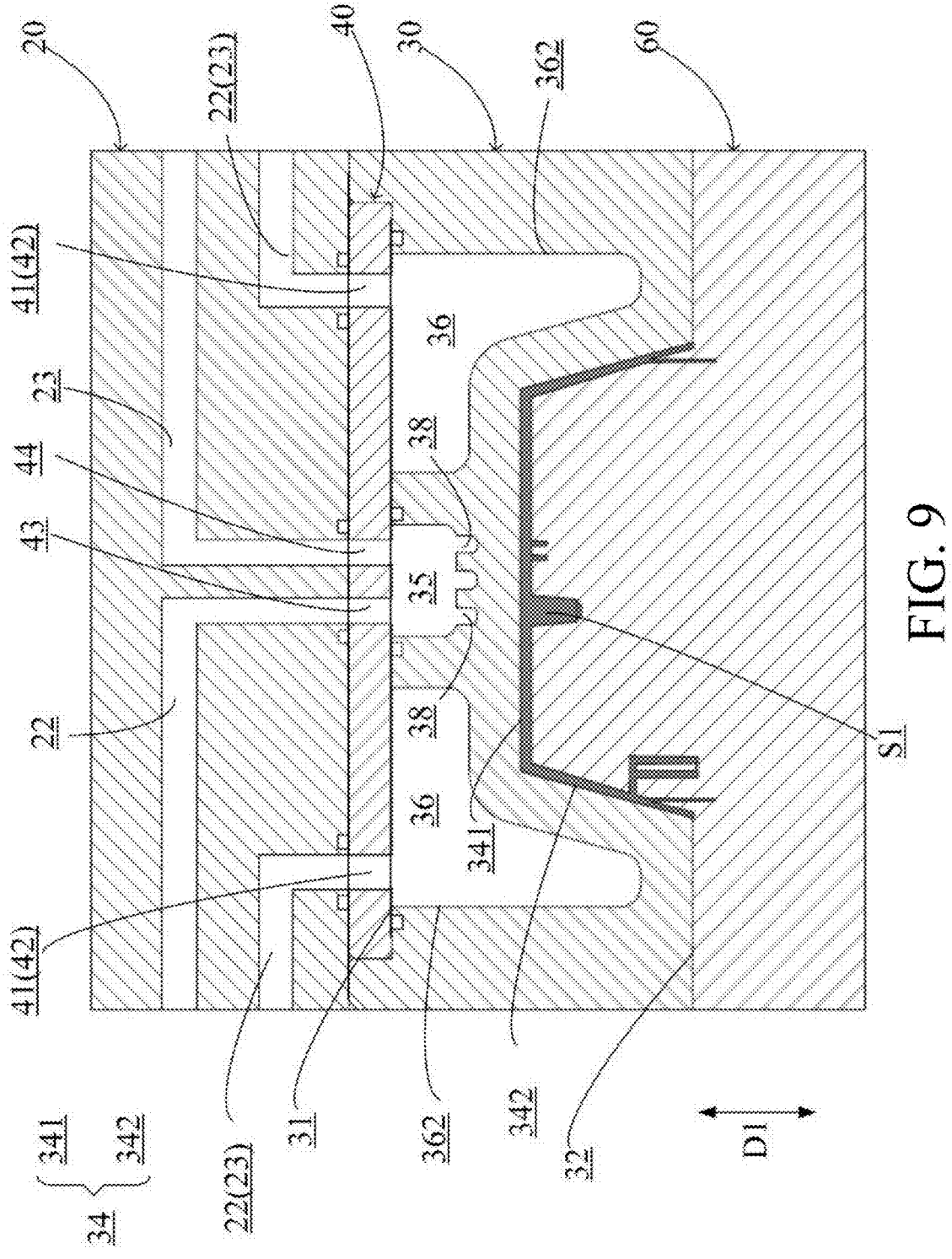
FIG. 9 is a schematic diagram illustrating the first mold, the first mold module, the cover plate, and the second mold module in accordance with the second embodiment of the present disclosure.

FIG. 8 is an exploded view of the first mold module 30 and the cover plate 40 in accordance with a second embodiment of the present disclosure. FIG. 9 is a schematic diagram of the first mold 20, the first mold module 30, the cover plate 40, and the second mold module 60 in accordance with the second embodiment of the present disclosure. In the second embodiment, each of the connection channels 37 is connected to two adjacent cooling channels 36, and each of the cooling channels 36 is connected to one of the connection channels 37. In the second embodiment, each of the first cooling holes 41 is in communication with one of the second ends 362 of the cooling channels 36, and each of the second cooling holes 42 is in communication with another adjacent one of the second ends 362 of the cooling channels 36.

The first mold module 30 further includes auxiliary grooves 38, in communication with the bottom of the central channel 35. The auxiliary grooves 38 are between the central channel 35 and the injection groove 34. The volume of the central channel 35 is greater than three times the volume of the auxiliary groove 38. The depth of the central channel 35 is greater than two times of the depth of the auxiliary groove 38.

Through the auxiliary grooves 38 in this embodiment, an improved cooling effect can be achieved for the plastic in the product chamber S1, and an improved structural strength of the first mold module 30 between the central channel 35 and the injection groove 34 can be achieved. Moreover, the auxiliary grooves 38 of the second embodiment may be applied to the first embodiment. In one embodiment, the second embodiment may not include the auxiliary grooves 38.

Figure 10:
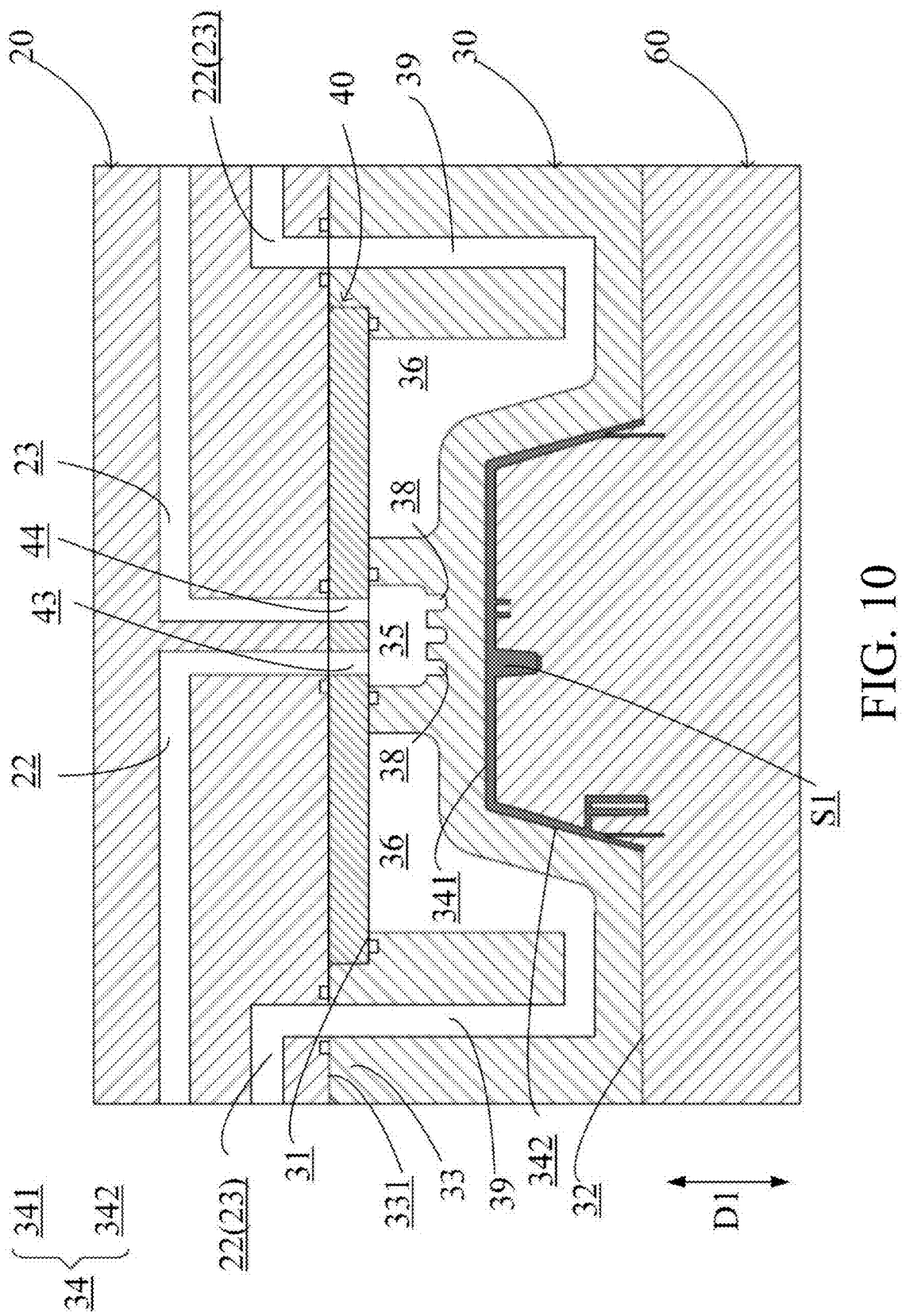
FIG. 10 is a schematic diagram illustrating the first mold, the first mold module, the cover plate, and the second mold module in accordance with a third embodiment of the present disclosure.

FIG. 10 is a schematic diagram of the first mold 20, the first mold module 30, the cover plate 40, and the second mold module 60 in accordance with a third embodiment of the present disclosure. In the third embodiment, the first mold module 30 further includes auxiliary channels 39 formed on the upper surface 31 or the top surface 331. Each of the auxiliary channels 39 is connected to one of the bottoms of the second ends 362 of the cooling channels 36. Each of the injection channels 22 is in communication with one of the auxiliary channels 39 or the central injection hole 43. Each of the exhaust channels 23 is in communication with one of the auxiliary channels 39 or the central exhaust hole 44. The cooling liquid can flow in or be exhausted through the bottoms of the second ends 362 of the cooling channels 36, thereby achieving an improved cooling effect.

In another embodiment, the auxiliary channels 39 are formed on the upper surface 31, and in communication with the first cooling holes 41 or the second cooling holes 42 (as shown in FIG. 9). The first cooling holes 41 or the second cooling holes 42 are in communication with the injection channels 22 or the exhaust channels 23. Moreover, in the third embodiment, the auxiliary grooves 38 may not be included.

In the present disclosure, the injection molding apparatus of the present disclosure can reduce the probability of bonding lines, stress marks, or air marks on the outer surface of the plastic product through the central channel, cooling channels, and connection channels of the first mold module, thereby improving the appearance of the plastic product.

Many details are often found in the relevant art, thus many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. An injection molding apparatus, comprising:
a first mold comprising a first receiving groove;
a first mold module disposed in the first receiving groove, wherein the first mold module comprises an upper surface, a lower surface, an injection groove formed on the lower surface, a central channel formed on the upper surface, and a plurality of cooling channels formed on the upper surface, the central channel and a plurality of first ends of the plurality of cooling channels are above the injection groove, and the central channel and the plurality of cooling channels are configured to be filled with a cooling fluid; and a cover plate disposed in the first receiving groove and covering the upper surface, the central channel, and the plurality of cooling channels,
wherein the injection groove, the central channel, and the plurality of cooling channels are separated from each other, and the plurality of cooling channels extend radially on the upper surface and surrounds the central channel.

2. The injection molding apparatus as claimed in claim 1, wherein the first mold module further comprises a plurality of connection channels, each of the plurality of connection channels is connected to two adjacent cooling channels of the plurality of cooling channels.

3. The injection molding apparatus as claimed in claim 2, wherein the plurality of connection channels is curved and arranged along an annular path, and the central channel is within the annular path.

4. The injection molding apparatus as claimed in claim 1, wherein the first mold module further comprises a plurality of auxiliary grooves in communication with the central channel, the plurality of auxiliary grooves is located between the central channel and the injection groove, and a volume of the central channel is greater than three times a volume of each of the plurality of auxiliary grooves.

5. The injection molding apparatus as claimed in claim 1, wherein the central channel is in a central area of the upper surface, the plurality of cooling channels is in an edge area of the upper surface, and the edge area surrounds the central area.

6. The injection molding apparatus as claimed in claim 1, wherein each of openings of the plurality of cooling channels on the upper surface is an elongated structure and extends linearly, and each of extensions of the openings of the plurality of cooling channels on the upper surface passes through the central channel.

7. The injection molding apparatus as claimed in claim 1, wherein the injection groove comprises a top surface, a side wall connected to the top surface, and the lower surface, and the side wall is inclined relative to the top surface and the lower surface, and wherein the central channel is over the top surface, and the plurality of cooling channels surrounds the side wall.

8. The injection molding apparatus as claimed in claim 7, wherein a width of the top surface is greater than two times a width of the central channel, and a depth of the central channel is greater than 0.3 times a distance between central channel and the injection groove.

9. The injection molding apparatus as claimed in claim 1, wherein the cover plate comprises a plurality of first cooling holes, a plurality of second cooling holes, a central injection hole, and a central exhaust hole, and
each of the plurality of first cooling holes and each of the plurality of second cooling holes is in communication with the plurality of cooling channels, and the central injection hole and the central exhaust hole are in communication with the central channel.

10. The injection molding apparatus as claimed in claim 9, wherein each of the plurality of first cooling holes is in communication with one side of a first set of the plurality of first ends of the plurality of cooling channels, and each of the plurality of second cooling holes is in communication with one side of a second set of the plurality of first ends of the plurality of cooling channels.

11. The injection molding apparatus as claimed in claim 9, wherein each of the plurality of first cooling holes is in communication with one of the plurality of first ends of the plurality of cooling channels, and each of the plurality of second cooling holes is in communication with one of a plurality of second ends of the plurality of cooling channels.

12. The injection molding apparatus as claimed in claim 9, wherein the first mold module further comprises a plurality of auxiliary channels, each of the plurality of auxiliary channels is in communication with one of bottoms of a plurality of second ends of the plurality of cooling channels, each of the plurality of first cooling holes is in communication with one of the plurality of first ends of the plurality of cooling channels, and each of the plurality of second cooling holes is in communication with one of the plurality of auxiliary channels.

13. The injection molding apparatus as claimed in claim 1, further comprising:
    a second mold under the first mold and comprising a second receiving groove; and
    a second mold module disposed in the second receiving groove and corresponding to the first mold module,
    wherein when the first mold module contacts the second mold module, a product chamber is formed between the injection groove and the second mold module.

14. The injection molding apparatus as claimed in claim 13, further comprising an injection mechanism configured to inject plastic into the product chamber when the first mold module is connected to the second mold module, wherein a plastic product is formed by the plastic after the plastic in the product chamber is cooled.

15. The injection molding apparatus as claimed in claim 14, further comprising an ejection mechanism configured to eject the plastic product out of the second mold module when the first mold module is separated from the second mold module.

16. The injection molding apparatus as claimed in claim 1, further comprising a central waterproof ring,
    wherein the first mold module further comprises a central seal groove formed on the upper surface, the central seal groove surrounds the central channel, and the central waterproof ring is disposed in the central seal groove and abuts the cover plate.

17. The injection molding apparatus as claimed in claim 1, further comprises a main waterproof ring,
    wherein the first mold module further comprises a main seal groove formed on the upper surface,
    the main seal groove surrounds the plurality of cooling channels, and the main waterproof ring is disposed in the main seal groove and abuts the cover plate.

\* \* \* \* \*